United States Patent [19]

Jackson

[11] Patent Number: 5,297,274
[45] Date of Patent: Mar. 22, 1994

[54] PERFORMANCE ANALYSIS OF PROGRAM IN MULTITHREAD OS BY CREATING CONCURRENTLY RUNNING THREAD GENERATING BREAKPOINT INTERRUPTS TO ACTIVE TRACING MONITOR

[75] Inventor: John W. Jackson, Southlake, Tex.

[73] Assignee: International Business Machines Corporation, Armonk, N.Y.

[21] Appl. No.: 685,582

[22] Filed: Apr. 15, 1991

[51] Int. Cl.$^5$ ............................................. G06F 11/34
[52] U.S. Cl. ............................. 395/500; 364/267.4; 364/281.7; 364/948.11; 364/DIG. 1; 371/19; 395/575; 395/700
[58] Field of Search ............... 371/19, 500, 575, 700; 395/375, 500, 700

[56] References Cited

U.S. PATENT DOCUMENTS

| | | | |
|---|---|---|---|
| 3,644,936 | 2/1972 | Hohwick et al. | 371/19 |
| 4,821,178 | 4/1989 | Levin et al. | 364/200 |
| 5,058,114 | 10/1991 | Kuboki et al. | 371/19 |
| 5,103,394 | 4/1992 | Blasciak | 395/575 |
| 5,121,489 | 6/1992 | Andrews | 395/375 |
| 5,121,501 | 6/1992 | Baumgartner et al. | 395/800 |
| 5,127,103 | 6/1992 | Hill et al. | 395/575 |
| 5,179,702 | 1/1993 | Spix et al. | 395/650 |

Primary Examiner—Robert B. Harrell
Assistant Examiner—Ken S. Kim
Attorney, Agent, or Firm—Andrew J. Dillon

[57] ABSTRACT

A method and apparatus for implementing a sampling performance analysis for a selected application within a multi-thread operating system having a high degree of isolation between applications within the operating system. A trace function, such as the well known DosPtrace application program interface is established and utilized to control the execution of the selected application. The trace function is then utilized to insert a running thread program into the selected application which continuously generates breakpoint interrupts on a periodic basis. Each time a breakpoint interrupt is generated by the running thread program execution of the selected application is suspended and the current state of the selected application, including its location counter, is examined and stored. These stored indications of the state of the selected application are then utilized to automatically generate a report including a distribution of the execution times for the selected application. Thereafter, the performance of the selected application may be examined and areas of the application requiring excessive execution time may be identified.

8 Claims, 3 Drawing Sheets

```
Total Samples=12106        ┌90                 Fig. 4
Execution Distribution by Module:
C:\OS2\DLL\BVHWNDW.DLL                              3.72%
C:\OS2\DLL\BVSCALLS.DLL                             2.62%
C:\OS2\DLL\DOSCALL1.DLL                             0.89%
C:\OS2\DLL\PMWIN.DLL                                4.98%
C:\OS2\DLL\DISPLAY.DLL                             11.95%
C:\OS2\DLL\PMGRE.DLL                                1.21%
C:\OS2\DLL\PMVIOP.DLL                               0.94%
C:\OS2TOOLS\FINDER.EXE    ┌92                      73.69%
Execution Distribution by Function:
DEVENABLE                                           2.20%
BUFFERUPDATE                                        1.52%
BVSGETPTRDRAWNAME                                   0.05%
WINSETKBDLAYOUT                                     0.10%
WINENABLEWINDOW                                     0.05%
WINDESTROYMSGQUEUE                                  3.09%
WINMAPDLGPOINTS                                     0.10%
WINUPPERCHAR                                        0.05%
FSRSEMENTER                                         0.05%
AABGETREG                                           0.16%
WINLOCKSTARTINPUT                                   0.05%
WINDRAWBITMAP                                       0.05%
WINMESSAGEBOX                                       0.31%
WINSETMULTWINDOWPOS                                 0.05%
WINDEFQUEUEPROC                                     0.05%
WINQUERYQUEUESTATUS                                 0.05%
WINDESTROYWINDOW                                    0.05%
_main                                               0.05%
_Work01                                             0.05%
_fput                                               0.21%
_Dir01                                             19.23%
_File01                                             8.44%
_GetNextFile                                        3.98%
_bs01                                               0.37%
_GetSearchOutput                                   21.33%
_fsearch                                           19.76%
_strcat                                             0.05%
_endthread                                          0.21%
                          ┌94
Execution Distribution by Source Line Number:
finder.c        183 _main                           0.05%
finder.c        822 _Work01                         0.05%
finder.c        948 _fput                           0.16%
finder.c        949 _fput                           0.05%
findlib.c       309 _Dir01                          0.42%
findlib.c       323 _Dir01                         14.94%
findlib.c       372 _Dir01                          0.21%
findlib.c       404 _Dir01                          2.10%
findlib.c       437 _Dir01                          0.63%
findlib.c       439 _Dir01                          0.94%
findlib.c       526 _File01                         5.87%
findlib.c       578 _File01                         0.84%
findlib.c       579 _File01                         0.37%
findlib.c       580 _File01                         0.63%
findlib.c       584 _File01                         0.16%
findlib.c       661 _File01                         0.58%
findlib.c       694 _GetNextFile                    0.16%
findlib.c       743 _GetNextFile                    3.77%
findlib.c       760 _GetNextFile                    0.05%
findlib.c       795 _bs01                           0.37%
findlib.c       900 _GetSearchOutput               21.33%
```

PERFORMANCE ANALYSIS OF PROGRAM IN MULTITHREAD OS BY CREATING CONCURRENTLY RUNNING THREAD GENERATING BREAKPOINT INTERRUPTS TO ACTIVE TRACING MONITOR

BACKGROUND OF THE INVENTION

1. Technical Field

The present invention relates in general to the field of software application analysis and in particular to a method and apparatus for implementing a sampling performance analysis within a software application. Still more particularly, the present invention relates to a method and apparatus for implementing a sampling performance analysis within a multi-thread operating system having a high degree of isolation between applications.

2. Description of the Related Art

Performance analysis of software applications within a data processing system is a well known technique in the prior art. Two basic techniques are generally utilized for such analysis. Firstly, a timing strategy may be utilized to analyze a software application. A system clock may be utilized to time selected events within the application by placing so-called "hooks" within the code of the application and then storing the time at which each of these "hooks" occurs.

This technique works well; however, it is necessary to be able to modify the application within the operating system in order to insert the software "hooks." Selected operating systems, such as the OS/2 Operating System distributed by International Business Machines Corporation of Armonk, N.Y., include a high degree of isolation between applications within the operating system and are not easily modifiable. In such an operating system the user may not be aware of the internal workings of an application within the operating system and may not be able to easily modify the code within an application.

A second technique for analyzing a software application to locate hot spots or areas which may take excessive amounts of execution time is the so-called "Monte Carlo" sampling performance analysis wherein a the execution location of the code within an application is periodically captured and utilized to perform a statistical analysis of the execution of that application. As above, a Monte Carlo analysis technique may not be utilized for a software application within a multi-thread operating system which includes a high degree of isolation between applications, due to the protective nature of the operating system. Thus, the information necessary to perform a Monte Carol analysis is not readily available.

It should therefore be apparent that a need exists for a method and apparatus for performing an execution analysis of a selected application within a multi-thread operating system having a high degree of isolation between applications within the operating system.

SUMMARY OF THE INVENTION

It is therefore one object of the present invention to provide an improved software application analysis technique.

It is another object of the present application to provide an improved method and apparatus for implementing a sampling performance analysis within a software application.

It is yet another object of the present invention to provide an improved method and apparatus for implementing a sampling performance analysis within a multi-thread operating system having a high degree of isolation between applications within the operating system.

The foregoing objects are achieved as is now described. The method and apparatus of the present invention may be utilized to implement a sampling performance analysis for a selected application within a multi-thread operating system having a high degree of isolation between applications within the operating system. A trace function, such as the well known DosPtrace application program interface is established and utilized to control the execution of the selected application. The trace function is then utilized to insert a running thread program into the selected application which continuously generates breakpoint interrupts on a periodic basis. Each time a breakpoint interrupt is generated by the running thread program execution of the selected application is suspended and the current state of the selected application, including its location counter, is examined and stored. These stored indications of the state of the selected application are then utilized to automatically generate a report including a distribution of the execution times for the selected application. Thereafter, the performance of the selected application may be examined and areas of the application requiring excessive execution time may be identified.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a sample output report of a software application analysis utilizing the method and apparatus of the present invention.

DETAILED DESCRIPTION OF PREFERRED EMBODIMENT

Figure 1:
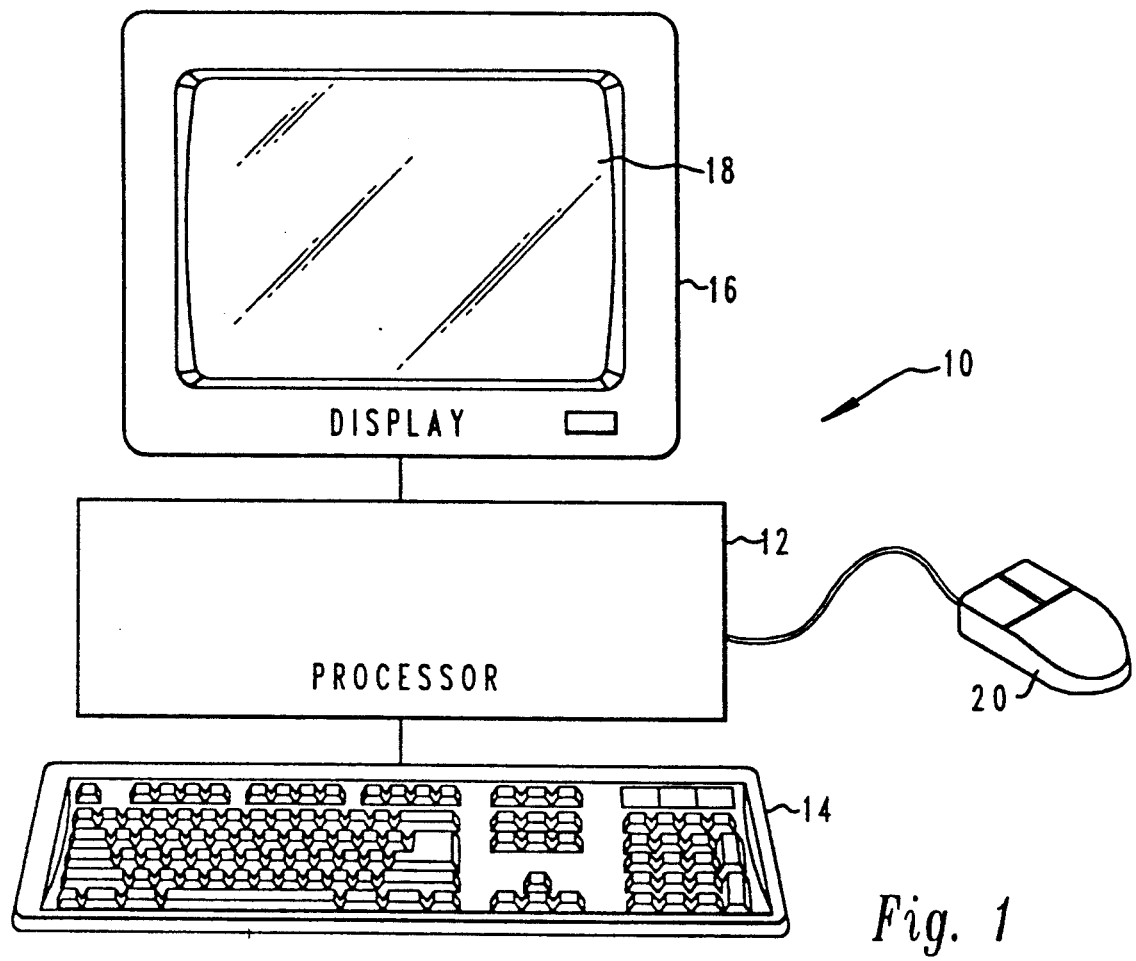
FIG. 1 is a pictorial representation of a data processing system which may be utilized to implement the method and apparatus of the present invention.

With reference now to the figures and in particular with reference to FIG. 1, there is depicted a pictorial representation of a data processing system 10 which may be utilized to implement the method and apparatus of the present invention. As is illustrated, data processing system 10 includes a processor 12 which is coupled to keyboard 14 and display device 16 in a manner well known in the art. Display device 16 includes a display screen 18. Those skilled in the art will appreciate that data processing system 10 may be implemented by utilizing any suitable computer including the so-called "personal computer" or other similar processing units. One example of a data processing system which may be utilized to implement the method and apparatus of the present invention is the International Business Machines Corporation personal computer PS/2. As those skilled in the art will appreciate the personal computer PS/2 may be operated utilizing an operating system such as OS/2. The OS/2 operating system provides a high degree of isolation between applications and is thus not easily modifiable.

Figure 2:
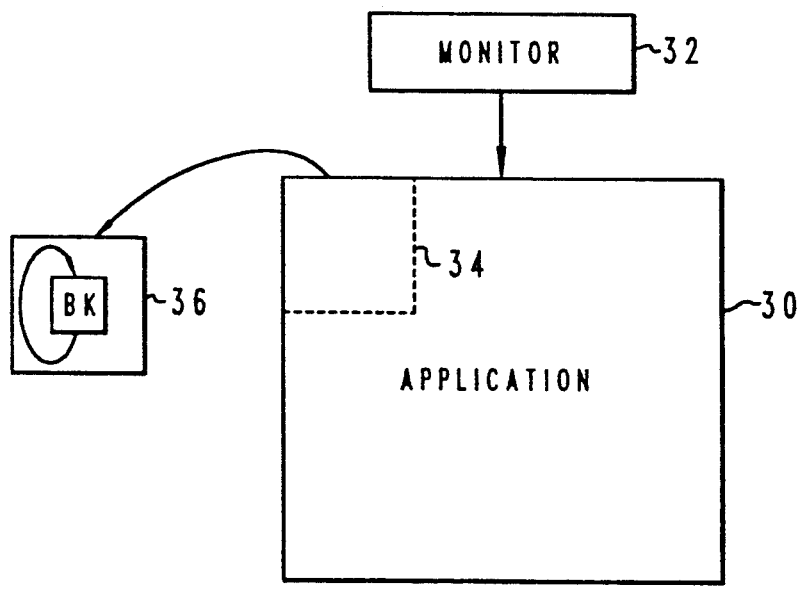
FIG. 2 is pictorial representation of a software application being monitored by a trace function and running thread program in accordance with the method and apparatus of the present invention.

Referring now to FIG. 2 there is depicted a pictorial representation of a software application being monitored utilizing a trace function and running thread program in accordance with the method and apparatus of the present invention. As is illustrated, an application 30 is being monitored by monitor function 32. Monitor function 32 preferably is utilized to control application 30 that such that an execution analysis may be performed. Control of application 30 is necessary so that application 3o may be interrupted at frequent intervals to statistically analyze the execution of application 30. Monitor function 32 preferably includes a standard application Program Interface (API) called DosPtrace which lets a parent process control the execution of a child process and access the memory of the child process directly.

The well known DosPtrace interface cannot be utilized to implement a so-called "Monte Carlo" analysis technique because the DosPtrace function does not allow return of control to the monitoring program until a significant event has occurred within application 30. Examples of significant events include a breakpoint, a non-maskable interrupt, a single-step interrupt or the end of the program.

The protective nature of the OS/2 operating system makes it difficult to insert breakpoints within an application operating within that operating system. However, the DosPtrace function may be utilized to insert a so-called "mole" program within the memory space of application 30. Thus, in accordance with an important feature of the present invention monitor application 32 inserts within memory space 34 of application 30 start-up code which may be utilized to initiate a "mole" program 36. Mole program 36 is then utilized as a running thread program to continuously generate breakpoint interrupts on a periodic basis.

Thus, each time mole program 36 generates a breakpoint the execution of application 30 is temporarily suspended and monitor function 32 may be utilized to analyze the current state of the registers within application 30 and determine where execution is taking place. In the depicted embodiment of the present invention, at the first breakpoint, mole program 36 is established as a separate thread within the operating system and the application code within memory space 34 is rewritten to permit application 30 to operate normally.

Figure 3:
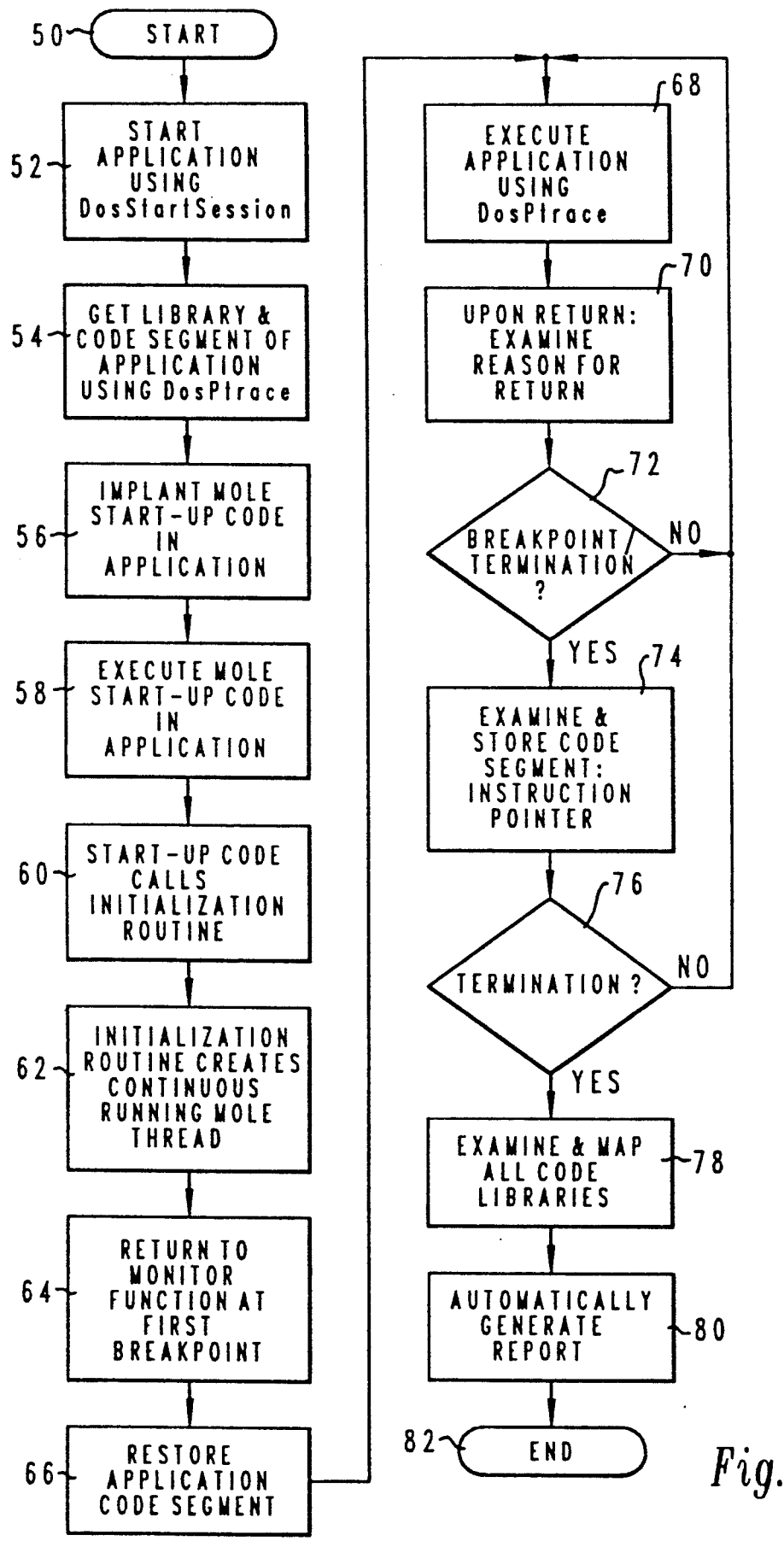
FIG. 3 is a logic flowchart illustrating a software application analysis performed utilizing the method and apparatus of the present invention.

With reference now to FIG. 3, there is depicted a logic flowchart illustrating a software application analysis performed utilizing the method and apparatus of the present invention. As illustrated, the process begins at block 50 and thereafter passes to block 52 which depicts the starting of application 30 (see FIG. 2) utilizing DosStartSession. Thereafter, the process passes to block 54 which illustrates the retrieval of the library and code segment of application 30 utilizing the aforementioned DosPtrace function.

At this point, the DosPtrace function is utilized to implant the so-called "mole" start-up code within memory space 34 of application 30 (see FIG. 2), as illustrated in block 56. Thereafter, as depicted in block 58, this start-up code is executed within application 30 utilizing DosPtrace.

After executing the "mole" start-up code within an application under analysis the process passes to block 60 which illustrates the calling of an initialization routine for application 30. This initialization routine is then utilized, as depicted in block 62, to create a continuously running mole thread, as illustrated within block 36 of FIG. 2. Upon the occurrence of a breakpoint generated by the continuously running mole thread application within block 36, the process returns to the monitor function, as illustrated in block 64. As discussed above, the DosPtrace function will return control from the application under study to the DosPtrace function upon the occurrence of a significant event, such as a breakpoint.

In accordance with an important feature of the present invention, after returning to the monitor function upon the occurrence of the first generated breakpoint, block 66 illustrates the restoration of the code segment into memory section 34 of application 30 (see FIG. 2) which was previously present within that memory section. Thus, application 30 is returned to its original condition with a continuously running mole thread program established within another thread of the operating system associated with application 30.

At this point, as illustrated in block 68, application 30 is started utilizing the DosPtrace function. Thereafter, each time control is returned to the DosPtrace function within monitor function 32 (see FIG. 2) the reason for the return is examined. As discussed above, once started a child process will return control to the parent process utilizing the DosPtrace function each time it encounters a significant point such as a breakpoint, a non-maskable interrupt, a single-step interrupt, or the end of the program.

Next, block 72 is utilized to determine whether the reason for return of control to the DosPtrace function from application 30 is a breakpoint or termination. If not, the process returns to block 68 to continue in an iterative fashion. Alternatively, if the reason for return to the DosPtrace function is a breakpoint or termination, the process passes to block 74 which illustrates the examination and storing of the current code section and instruction pointer within application 30. Those skilled in the art will appreciate that this information may then be utilized to generate a "Monte Carlo" analysis of application 30. Next, the process passes to block 76 to determine whether or not the reason for return to the DosPtrace function was a termination. If not, the process returns to block 68 in an iterative fashion.

Referring again to block 76 if the reason for return to the DosPtrace function from application 30 was a termination of the application the process then passes to block 78 which depicts an examination and mapping of all code libraries. Thereafter, the process passes to block 80 which illustrates the automatic generation of a report analyzing the performance of application 30. The process then terminates, as depicted in block 82.

Finally, referring now to FIG. 4, there is depicted a sample output report of a software application analysis utilizing the method and apparatus of the present invention. As depicted, the sample output report may be utilized to generate an analysis of application 30 by showing the execution distribution within application 30 by module, as depicted at reference numeral 90. Alternatively, execution distribution may be depicted by function, as illustrated at reference numeral 92 or by source code line number, as depicted at reference numeral 94. Upon reference to the foregoing those skilled in the art will appreciate that by temporarily inserting start-up code into an application within an operating system having a high degree of isolation between applications, a continuously running thread program may be established to continuously generate breakpoints on a periodic basis. Thereafter, by reestablishing the original code within the application and performing the continuously running thread program on an alternate thread within the operating system breakpoints may be periodically generated while the application under study is running so that a "Monte Carlo" analysis of the application may take place, despite the protective nature of the operating system.

While the invention has been particularly shown and described with reference to a preferred embodiment, it will be understood by those skilled in the art that various changes in form and detail may be made therein without departing from the spirit and scope of the invention.

I claim:

1. A method in a data processing system for implementing a sampling performance analysis for a selected application within a multi-thread operating system having a high degree of isolation between applications within the operating system, said method comprising the data processing system implemented steps of:
   initiating a trace function for controlling the execution of a selected application and accessing memory within said selected application;
   substituting a mole program for a selected code segment at a particular memory location within said selected application;
   in response to an initial execution of said mold program within said selected application, initiating a separate running thread program within said operating system and rewriting said selected code segment at said particular memory location within said selected application, said separate running thread program continuously generating break point interrupts on a periodic basis;
   in response to each break point interrupt generated by said separate running thread program during execution of said selected application suspending execution of said selected application, examining said selected application utilizing said trace function and storing an indication of a current execution location within said selected application at said suspension for utilization in performance analysis; and
   thereafter, resuming execution of said selected application.

2. The method in a data processing system for implementing a sampling performance analysis for a selected application within a multi-thread operating system according to claim 1, further including the step of performing an analysis of each of said stored execution location indications.

3. The method in a data processing system for implementing a sampling performance analysis for a selected application within a multi-thread operating system according to claim 2, wherein said analysis comprises an analysis of a distribution of execution time at selected execution locations within said selected application.

4. The method in a data processing system for implementing a sampling performance analysis for a selected application within a multi-thread operating system according to claim 3, further including the step of generating a report of said analysis.

5. A data processing system for implementing a sampling performance analysis for a selected application within a multi-thread operating system having a high degree of isolation between applications within the operating system, said data processing system comprising:
   a trace function for controlling the execution of a selected application and accessing memory within said selected application;
   means for substituting a mole program for a selected code segment at a particular memory location within said selected application;
   means for initiating a separate running thread program within said operating system and rewriting said selected code segment at said particular memory location within said selected application in response to an initial execution of said mole program within said selected application, said separate running thread program continuously generating break point interrupts on a periodic basis;
   means for suspending execution of said selected application, examining said selected application utilizing said trace function and storing an indication of a current execution location within said selected application at said suspension for utilization in performance analysis in response to each break point interrupt generated by said separate running thread program; and
   means for thereafter resuming execution of said selected application.

6. The data processing system for implementing a sampling performance analysis for a selected application within a multi-thread operating system according to claim 5, further including means for performing an analysis of each of said stored execution location indications.

7. The data processing system for implementing a sampling performance analysis for a selected application within a multi-thread operating system according to claim 6, wherein said means for performing an analysis of each of said stored execution location indications comprises means for creating an analysis of a distribution of execution time at selected execution locations within said selected application.

8. The data processing system for implementing a sampling performance analysis for a selected application within a multi-thread operating system according to claim 7, further including means for generating a report of said analysis.

* * * * *